(12) United States Patent
Wei et al.

(10) Patent No.: US 7,631,020 B1
(45) Date of Patent: Dec. 8, 2009

(54) METHOD AND SYSTEM OF GENERATING A PROXY FOR A DATABASE

(75) Inventors: Gaohong Wei, Mountain View, CA (US); Qiang Li, Foster City, CA (US); HanCheng Hsiung, Union City, CA (US); Mark F. Wu, Foster City, CA (US); Lalgudi V. Sujatha, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 331 days.

(21) Appl. No.: 10/909,028

(22) Filed: Jul. 30, 2004

(51) Int. Cl.
*G06F 17/30* (2006.01)
(52) U.S. Cl. ...................................... 707/204
(58) Field of Classification Search .............. 707/100 S, 707/200 S, 203; 714/1–10
See application file for complete search history.

(56) References Cited

U.S. PATENT DOCUMENTS 6,078,932 A * 6/2000 Haye et al. .................. 707/204

| | | | |
|---|---|---|---|
| 2003/0220935 A1* | 11/2003 | Vivian et al. ................. | 707/102 |
| 2005/0010731 A1* | 1/2005 | Zalewski et al. ............. | 711/162 |
| 2006/0150001 A1* | 7/2006 | Eguchi et al. ................. | 714/6 |
| 2006/0206536 A1* | 9/2006 | Sawdon et al. .............. | 707/200 |
| 2006/0206538 A1* | 9/2006 | Veazey ........................ | 707/202 |

OTHER PUBLICATIONS

Shahed Quazi, "Split Mirror Using Suspended I/O in IBM DB2 Universal Database Version 7," *IBM Canada, Toronto Laboratory*, Apr. 1, 2002, pp. 1-10, http:www-128.ibm.com/developerworks/db2/library/techarticle/0204quazi/0204quazi.html, printed Feb. 13, 2007.

* cited by examiner

*Primary Examiner*—John R. Cottingham
*Assistant Examiner*—Kimberly Lovel
(74) *Attorney, Agent, or Firm*—Campbell Stephenson LLP (57) ABSTRACT

A method and system of generating a proxy for a database is disclosed. According to one embodiment, a method is provided wherein an image creation technique used to create a point-in-time image of a database is identified, a logical copy of the point-in-time image of the database is created using the image creation technique, and the logical copy of the point-in-time image of the database is presented as a proxy for the database. In another embodiment, one or more updates applied to the database following the creation of the point-in-time image are applied to the logical copy of the point-in-time image of the database.

31 Claims, 6 Drawing Sheets

METHOD AND SYSTEM OF GENERATING A PROXY FOR A DATABASE

BACKGROUND

1. Technical Field

The present invention relates to data storage and retrieval generally and more particularly to a method and system of generating a proxy for a database.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, companies must be prepared to eliminate or minimize data loss, and recover quickly with useable data. One technique used to prevent data loss and enterprise downtime is to maintain a number of additional copies of enterprise data (e.g., via data replication, mirroring, or the like). Such additional data copies may be used in a number of ways.

For example, an additional copy of data may be used to restore data lost when a storage device is corrupted or fails, to verify the consistency or accuracy of data, and/or in a clustering environment for parallel access or failover. Similarly, additional data copies may be used to test or evaluate the impact, if any, of data processing system changes (e.g., software or hardware), and/or operations on the data itself (e.g., changes to data format, updates to the data, or the like). A copy of data may be logical or physical and may reflect the state of data at a particular point-in-time (PIT) or may be updated, synchronously or asynchronously, to correspond with the original data over a period of time. A physical copy of data is an exact duplicate, having identical data stored or arranged in an identical physical storage structure on a storage medium. A logical copy, by contrast, may be accessed in the same way as the original data or a physical copy, but need not contain identical data or have an identical physical storage structure as the original data. Consequently a logical copy may subsume a physical copy in some instances.

Figure 1:
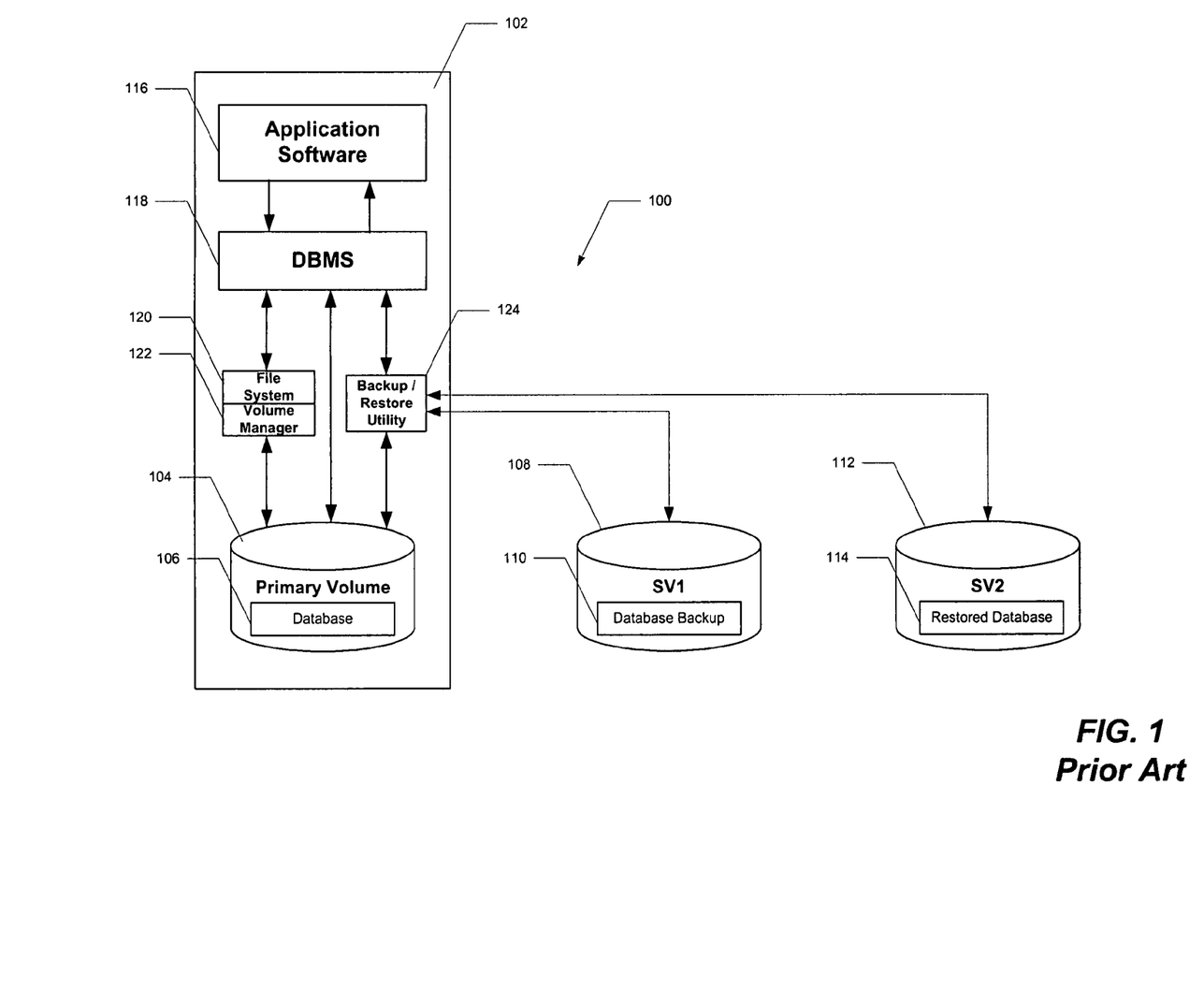
FIG. 1 illustrates a block diagram of a data processing system including a backup/restore utility for generating a copy of a database according to the prior art.

Copies or "proxies" of data may also be created in a number of ways. For example, FIG. 1 illustrates a block diagram of a data processing system including a backup/restore utility for generating a copy of a database according to the prior art. Data processing system 100 of FIG. 1 includes a first node 102 including a primary volume 104 used to store a database 106, a secondary volume 108 communicatively coupled to first node 102 and used to store a backup 110 of database 106, and a secondary volume 112 similarly coupled to first node 102 and used to store restored database 114 as shown.

First node 102 further includes application software 116 coupled to a database management system (DBMS) 118 which is in turn coupled to primary volume 104. DBMS 116 may be coupled to primary volume 104 directly, using a file system 120 and/or volume manager 122, or using a backup/restore utility 124 as described further herein. A database management system (DBMS), or "database manager", is a program that lets one or more computer users or applications such as application software 116 create and access data in a database. A DBMS manages requests so that users and other application software programs are free from having to understand where the data is physically stored and, in a multi-user, multi-processing, or parallel processing system, what other entities may also be accessing the data.

In handling requests, a DBMS ensures the integrity of data (that is, making sure it continues to be accessible and is consistently organized as intended) and security (making sure only those with access privileges can access the data). Some examples of personal computer platform relational DBMSs are Access® and SQL Server® provided by Microsoft Corporation of Redmond, Wash., DB2® provided by International Business Machines (IBM) Corporation of Armonk, N.Y., ORACLE DBMS® provided by Oracle Corporation of Redwood Shores, Calif., and Sybase Adaptive Server® Enterprise provided by Sybase Corporation of Dublin, Calif.

Backup/restore utility 124 may be implemented as an independent element as illustrated in FIG. 1, or may be incorporated into one or more other elements (e.g., DBMS 118) of data processing system 100. Using backup utility 124, a logical copy of database 106 can be created by first generating backup 110 on secondary volume 108 and then processing or "restoring" backup 110 to create restored database 114 on secondary volume 112. As backup 110 is restored prior to being accessed, it is not considered a logical copy of database 106 such as restored database 114, which may be accessed in the same manner as the original data it replicates. While backup 110 and logical copy 114 have been illustrated as being generated on separate secondary volumes this need not necessarily be the case. In other data processing systems according to the prior art, backup 110 and/or restored database 114 may be generated on a single secondary volume or within primary volume 104.

Where the original database is large, backup and/or restoration can take considerable amounts of time and resources to complete, making the illustrated technique for creating a data or database copy undesirable in a number of situations. Similarly, as logical names (e.g., a database name, table space name, or partition number) are specified in a conventional request to create a backup such as backup 110, a user implementing backup/restore utility 124 may not be required to have any knowledge of the physical components or structure of database 106. For the same reason however, backup/restore utility 124 may not be integrated with any other utilities or data management resources which require knowledge of such components and, consequently, may not take advantage of any newly-developed data management applications or utilities.

Figure 2:
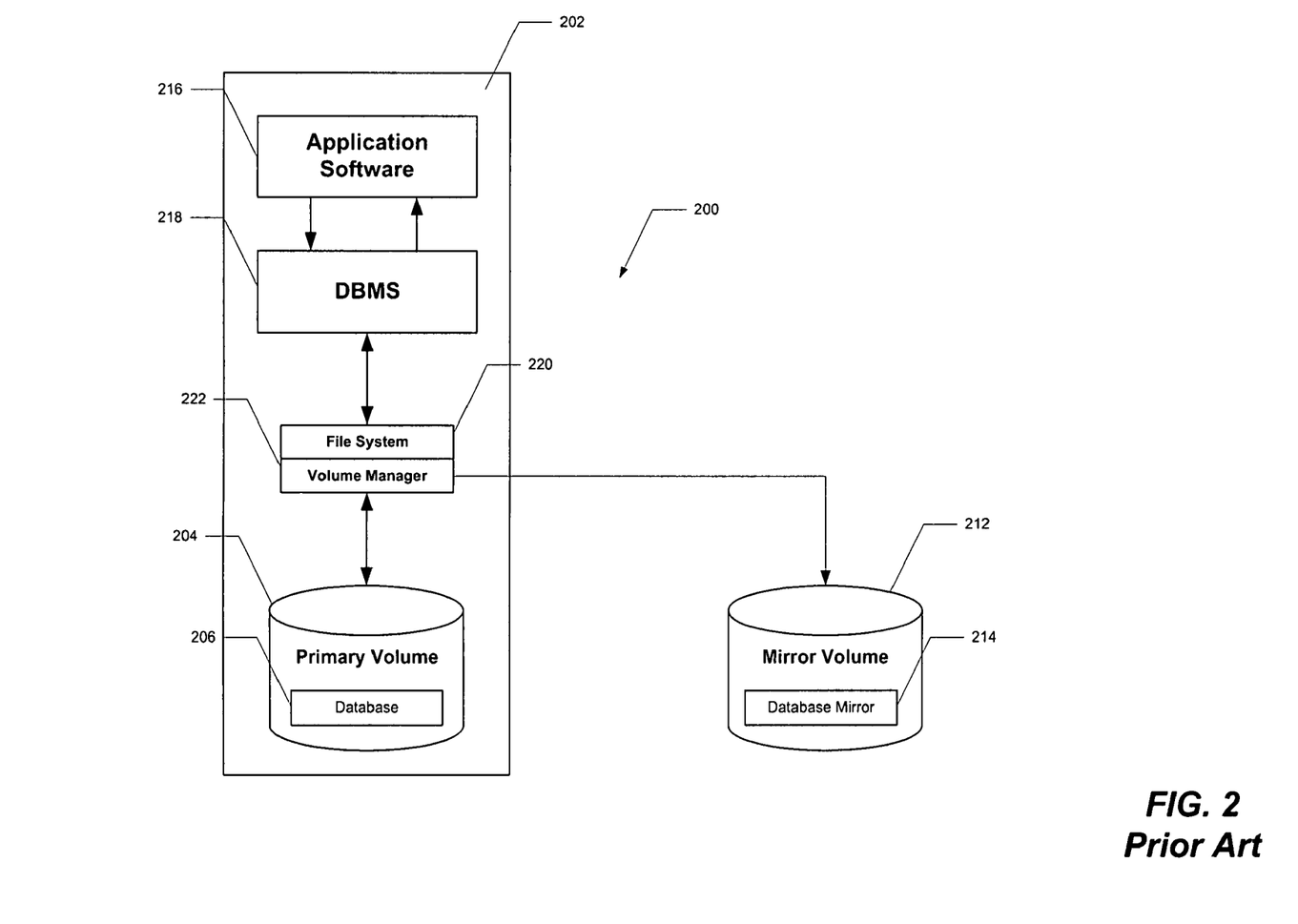
FIG. 2 illustrates a block diagram of a data processing system for generating a copy of a database using a split mirror according to the prior art.

Another technique used to create one or more copies of data relies on data volume mirroring. FIG. 2 illustrates a block diagram of a data processing system for generating a copy of a database using a split mirror according to the prior art. Data processing system 200 includes a first node 202 including a primary volume 204 used to store a database 206 and a secondary mirror volume 212 coupled to the first node 202. First node 202 of the embodiment of FIG. 2 further includes application software 216 coupled to a DBMS 218, which is in turn communicatively coupled to primary volume 204. DBMS 218 of the illustrated prior art embodiment may be coupled to primary volume 204 using a file system 220 and/or volume manager 222 or directly (not shown) as described further herein.

A "split mirror" is a point-in-time copy of one or more disk volumes that can be attached to the same or different node as the disk volume(s) being mirrored. A split mirror is generated by first creating a mirror by "mirroring" or copying write operations or "updates" performed on one volume to another secondary volume. This copying or duplication can be done as writes to the "mirrored" volume are received, or alternatively following a suspension of activity (e.g., suspension of database 206) on the mirrored volume. Where mirroring is performed following a suspension of activity on the mirrored volume, writes or updates received following suspension may be stored in system memory without being written to the mirrored volume's persistent store. Consequently, write operations or updates received when activity is suspended on the mirrored volume will not be copied to the volume's mirror. The created mirror is then "split off" by ceasing to copy write operations or updates, thus creating a PIT image of the mirrored data volume at the point in time when write operation or update mirroring ceases. While split mirror creation in the illustrated embodiment of FIG. 2 is performed using volume manager 222, mirroring and/or split mirror creation may be performed in hardware or software by any of a variety of data processing system elements (e.g., application software 216, DBMS 218, file system 220, or the like).

While database copying operations which utilize split mirrors may not require time and resource-intensive backup and restore operations, the use of split mirroring to duplicate data suffers from a number of shortcomings. For example, mirroring is performed at a volume level requiring that a copy of an entire volume be made even if a copy of a comparatively small amount of data (e.g., one or more small components of a database, or a database containing little data) is to be made. Consequently, available storage space may be wasted and the number of databases for which copies may be made may be limited. Additionally, integration of mirroring and split mirror copies with other data storage and management applications and utilities in existing systems is limited.

SUMMARY OF THE INVENTION

Disclosed is a method and system of generating a proxy for a database. Embodiments of the present invention may enable the use of optimal image creation techniques to replicate each component of a database from a point-in-time image of the database. Consequently, embodiments of the present invention enable the generation of a proxy for a given database more quickly and efficiently and with less waste of processing and storage resources than conventional copying techniques.

According to one embodiment of the present invention, a method is provided wherein a an image creation technique used to create a point-in-time image of a database is identified, a logical copy of the point-in-time image of the database is created using the image creation technique, and the logical copy of the point-in-time image of the database is presented as a proxy for the database. In another embodiment, one or more updates applied to the database following the creation of the point-in-time image are applied to the logical copy of the point-in-time image of the database.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Disclosed herein is a method and system of generating a proxy for a database. In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 3:
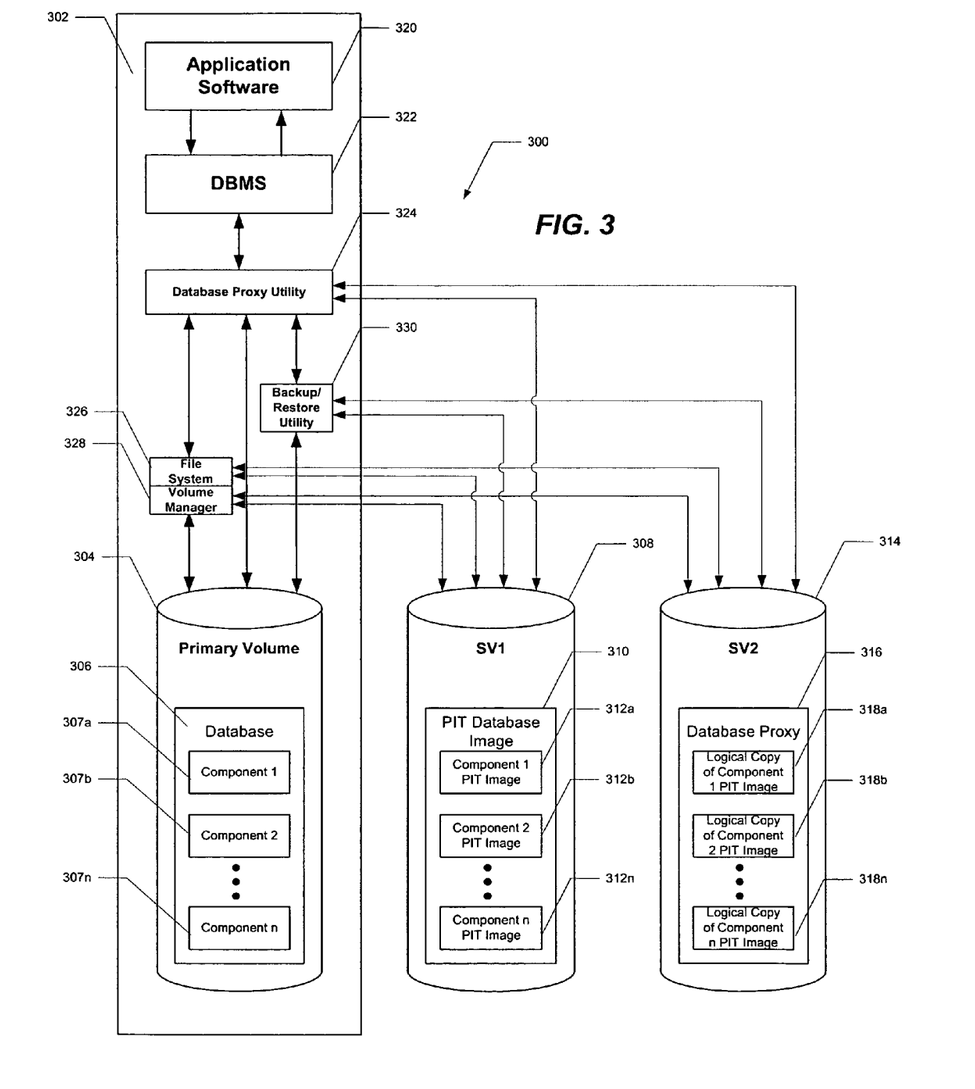
FIG. 3 illustrates a block diagram of a data processing system including a database proxy utility for generating a proxy for a database according to an embodiment of the present invention.

FIG. 3 illustrates a block diagram of a data processing system including a database proxy utility for generating a proxy for a database according to an embodiment of the present invention. Data processing system 300 includes a first node 302 including a primary volume 304 used to store a database 306, a secondary volume 308 communicatively coupled to first node 302 and used to store a point-in-time (PIT) database image 310, and a secondary volume 314 similarly coupled to first node 302 and used to store a logical copy 316 of PIT database image 310 as shown. In alternative embodiments of the present invention, database 306 may comprise a DB2® database provided by International Business Machines (IBM) Corporation of Armonk, N.Y.

A volume within the present description is generally a virtual disk, representing an addressable range of disk blocks used by applications such as file systems or databases. A volume may therefore include and have any spanning or mapping relationship with any number of physical storage devices. Consequently, while secondary volumes 308 and 314 have been illustrated within the embodiment of FIG. 3 as separate and distinct from first node 302, in alternative embodiments of the present invention first node 302 may include secondary volume 308 and/or secondary volume 314. First node 302 of the embodiment of FIG. 3 further includes application software 320 coupled to a database management system (DBMS) 322 which is coupled through database proxy utility 324 to primary volume 304. Database proxy utility 324 of the illustrated embodiment may be coupled to primary volume 304 directly, using a file system 326 and/or volume manager 328 (e.g., VERITAS Volume Manager®, provided by VERITAS Software Corporation of Mountain View, Calif.), or using a backup/restore utility 330 as shown.

In the illustrated embodiment of FIG. 3, each of database 306, PIT database image 310 of database 306, and database proxy 316 include a plurality of components (e.g., components 307a-n, 312a-n, and 318a-n, respectively). In the described embodiment, database proxy utility 324 may be utilized to generate database proxy 316 for database 306 by creating a logical copy of PIT database image 310 using an optimal image creation technique (e.g., a backup utility process, a replication process, a mirroring process, a file system checkpoint creation process, a volume snapshot creation process, a copy command, a volume or the like) for each duplicated component.

Figure 4A:
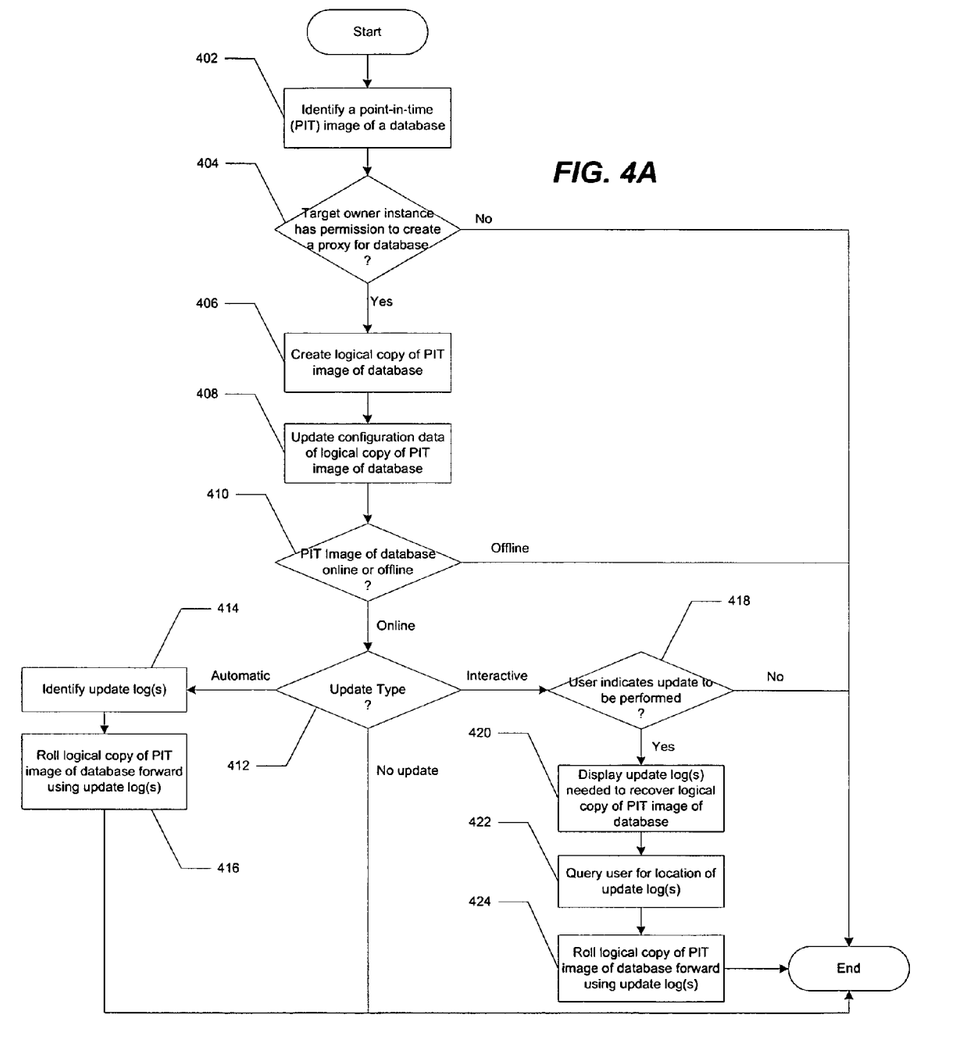
FIG. 4A illustrates a process flow diagram of a process for generating a proxy for a database according to an embodiment of the present invention.

FIG. 4A illustrates a process flow diagram of a process for generating a proxy for a database according to an embodiment of the present invention. Following initiation of the illustrated process embodiment (e.g., following the receipt of a request to create a proxy for a database), a point-in-time (PIT) image of a database for which a proxy is to be generated is identified (process block 402). According to different embodiments of the present invention, the identification of a PIT image of a database may include the querying of a user or process/application or the performance of a search process to determine the identity and/or location of such a PIT image. Moreover, according to one embodiment, the identification of a PIT image of a database includes the creation of the PIT image itself.

According to one embodiment of the present invention, an identified PIT image of a database includes a file system or "storage" checkpoint such as the storage checkpoint facility within VERITAS Storage Foundation® provided by VERITAS Software Corporation of Mountain View Calif. A storage checkpoint is a disk and I/O efficient snapshot technology for creating a "clone" of a mounted file system (e.g., the primary file system). Initially, a storage checkpoint contains file system mapping information (e.g., physical location, block mapping, and the like) of a primary fileset rather than actual user or application data. Because file system mapping information is used and no data is copied, creating a storage checkpoint takes very little time or storage space. A storage checkpoint initially satisfies read requests by locating data on the primary file system using its file system mapping information, and returning the data to a requesting process or user.

When the first write operation to a data block 'n' in the primary file system is received following the creation of a storage checkpoint, the original or "old" data is first copied to the storage checkpoint, and the primary file system is then updated with the new data. The storage checkpoint thus maintains the exact view of the primary file system at the time the storage checkpoint was taken. As data blocks are changed on the primary file system, the storage checkpoint gradually fills with the original data copied from the primary file system and less of the block map in the storage checkpoint points back to blocks on the primary file system.

Once a PIT database image has been identified, a determination is made whether a target database owner instance associated with the proxy creation request has permission to create a proxy of the database (process block 404). While any assignment or determination of access permissions will be unique to the particular system in which an embodiment of the present invention is implemented, according to one embodiment a determination is made that the target database owner instance has the necessary permissions to create a proxy where the target database owner instance is the same as the source database owner instance. In another embodiment, a determination is made that the target database owner instance has the necessary permissions to create a proxy where the target database owner instance is in the same user group as the source database owner instance (where their owner instances differ) and the access permissions of the source database owner instance allow a member of the source database owner instance's user group to perform any required operations (e.g., display, mount, unmount, remove, or the like) on a storage checkpoint of the source database.

If it is determined that a target database owner instance associated with the proxy creation request does not have permission to create a proxy for the database, the illustrated process terminates. According to an alternative embodiment of the present invention, repository structure (e.g., configuration data) access permissions of the source database owner instance may be modified by the illustrated process (not shown) in response to a determination that the source and target database owner instance belong to the same user group and the access permissions have not already been so changed. If, by contrast, it is determined that a target database owner instance associated with the proxy creation request does have permission to create a proxy for the database, a logical copy of the PIT image of the database is created (process block 406). Thereafter, configuration data (e.g., database owner instance, database base directory, new container path, or the like) of the created logical copy is updated as necessary (process block 408).

Once the configuration data of the logical copy of the PIT image of the database has been updated as needed, a determination is then made whether the PIT image of the database previously identified was created while the source database was offline (e.g., inactive) or online (process block 410). Where it is determined that the source database was offline at the time of PIT image creation, there will be no updates or transactions subsequent to such creation and so the logical copy of the PIT image of the database may be presented as a proxy for the database and immediately accessed. If a determination is made that the source database was online when the PIT image was made however, a subsequent determination is made as to how the PIT image is to be updated or "recovered" (process block 412), if at all. The determination illustrated by process block 412 may be made, for example, by querying a user as to which of a number of update types or processes are to be implemented (e.g., none, automatic, interactive). Alternatively, a default update type or process may be used or previously specified before it is determined that an update may be required.

Where no update is to be performed or provided (e.g., where no updates or transactions occurred subsequent to the creation of the PIT image or where such updates or transactions are not to be applied for some reason), the illustrated process is terminated. In response to a determination that an automatic update process is to be implemented, one or more update logs (e.g., a redo log or the like) are identified (process block 414) and the logical copy of the PIT image of the database is subsequently "rolled forward" by applying to it one or more of the updates or transactions specified by the identified update log (process block 416). Following a determination that an interactive update process is to be implemented at process block 412, another determination is made whether a user (e.g., in response to a prompt) has specified that no update is to be performed (process block 418).

The determination whether a user has specified that no update is to be performed then results either in termination of the illustrated process embodiment, or the display to a user of the update log(s) necessary to complete an update or "recovery" operation (process block 420). In the illustrated process, a user is then queried for a location of the necessary update log(s) (process block 422) which, once located, are similarly used to roll the logical copy of the PIT image of the database forward (process block 424). It should be readily appreciated that the users queried in the illustrated process embodiment of FIG. 4A may include any number of users (e.g., a single user used for each query or an exclusive user for each query).

Figure 4B:
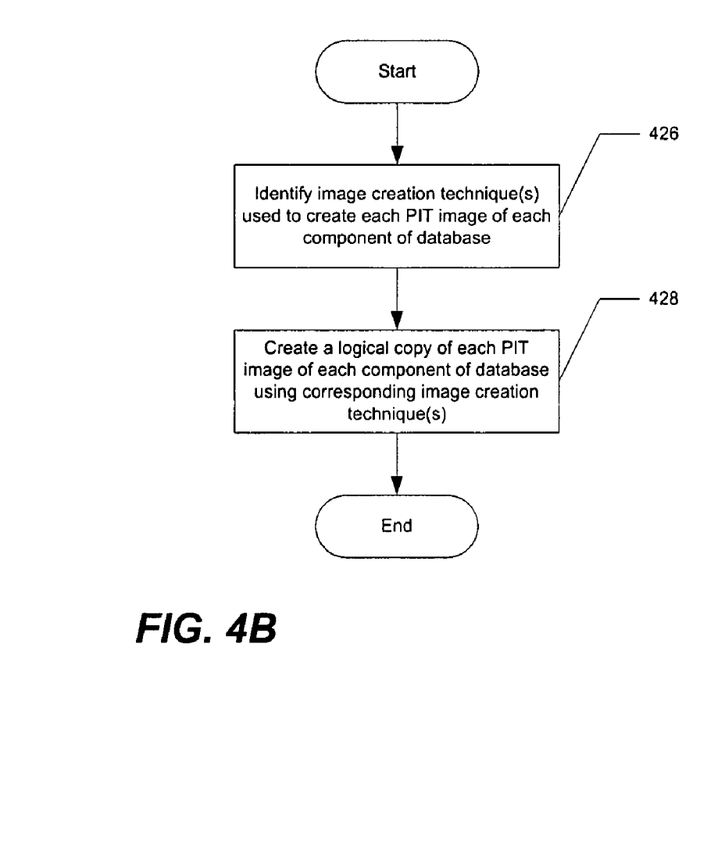
FIG. 4B illustrates a process flow diagram of an exemplary process for creating a logical copy of a PIT image of a database such as described in reference to FIG. 4A in greater detail.

FIG. 4B illustrates a process flow diagram of an exemplary process for creating a logical copy of a PIT image of a database such as described in reference to FIG. 4A in greater detail. Following initiation of the illustrated process embodiment, one or more image creation or copying technique(s) (e.g., a backup/restore utility process, a replication process, a mirroring process, a file system checkpoint creation process, a snapshot creation process, a file system or operating system-level "copy" command, or the like, or any combination thereof) used to create each PIT image of each component of a database is first identified (process block 426). A database component may include a database directory, table space container, redo log directory, redo log, or the like. According to one embodiment of the present invention, a backup/restore utility process may be used as a copying technique for one or more tablespaces having a large pre-allocated space but a small amount of actual data, or for an entire database where appropriate.

According to one embodiment of the present invention, a PIT image of a database includes data specifying the components of the database, the image creation or copying technique(s) used to create a PIT image of each of the components, and whether the PIT image was created when the underlying database was offline or online. Such data may then be used to determine which image creation technique(s) correspond to which database components as previously described. Once the image creation techniques have been identified, a logical copy of each PIT image of each component of the database is generated using corresponding image creation technique(s) (process block 428).

Figure 4C:
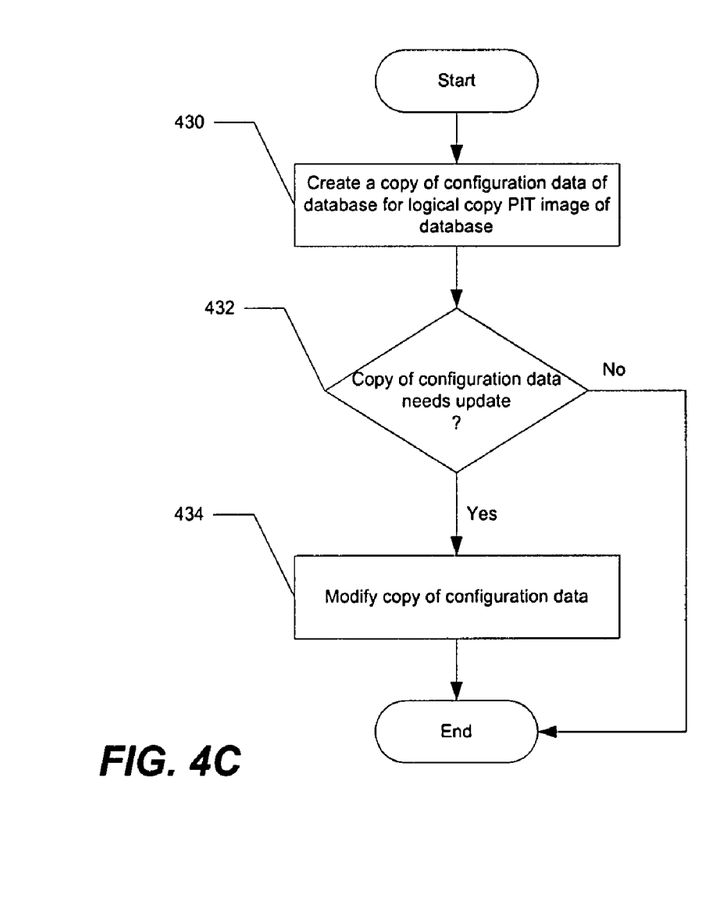
FIG. 4C illustrates a process flow diagram of an exemplary process for updating configuration data of a logical copy of a PIT image of a database such as described in reference to FIG. 4A in greater detail.

Depending on the technique used, a logical copy of a PIT image of a database may be created using one or more file systems, raw devices, storage checkpoints, volumes, backups from a backup/restore utility or a combination of any of the above. For example, if a database component is comparatively small in size its PIT image may be duplicated using an operating system (OS) command. If another database component is comparatively large in size, a different copying or image creation solution may be used (e.g., volume duplication, a split mirror or the like). A logical copy of a PIT image of a database presented as a database proxy may include configuration data (e.g., host data processing system, database owner instance, database name or identifier, component location, or the like) which differs from the original database that it replicates. FIG. 4C illustrates a process flow diagram of an exemplary process for updating configuration data of a logical copy of a PIT image of a database such as described in reference to FIG. 4A in greater detail. In the illustrated process embodiment of FIG. 4C, a copy of the configuration data of a database is initially generated for a logical copy of PIT image of a database (process block 430). Thereafter, a determination is made whether the duplicate configuration data needs to be updated (process block 432). If so, the duplicate configuration data is modified or updated as appropriate (process block 434). Thereafter, or if no duplicate configuration data update is required, the illustrated process terminates.

According to one embodiment of the present invention each request to create a proxy for a database includes a number of required parameters and may include one or more optional parameters which are used to determine whether a configuration data update needs to be performed. Required parameters of one such embodiment include a source database identifier, a storage checkpoint identifier, and data specifying a mount point of the identified storage checkpoint. Optional parameters may include, but are not limited to, source database owner instance (default is the same as the current instance), target database identifier (default is the source database identifier), target database base directory (default is the mount point of the identified storage checkpoint), redo log directory of the target database (default is under the mount point of the identified storage checkpoint), and archive log location of the source database.

Figure 5:
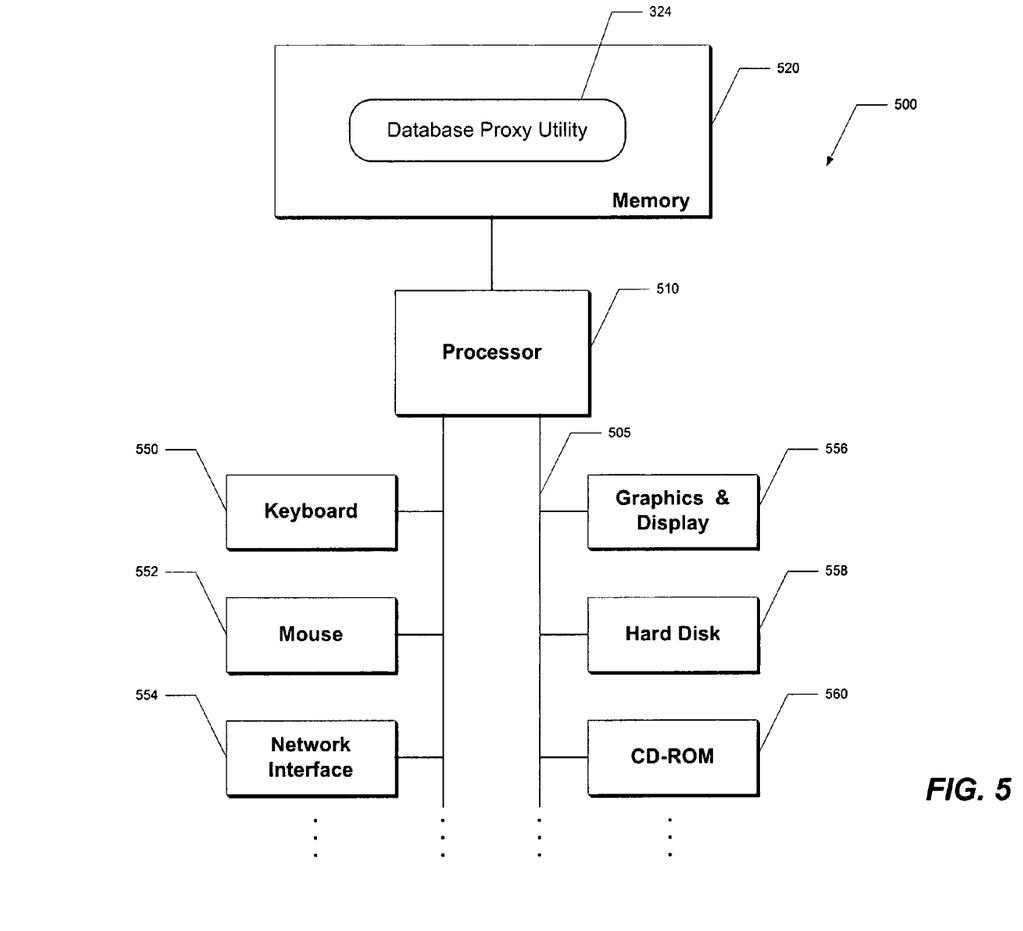
FIG. 5 illustrates a block diagram of a data processing system useable with one or more embodiments of the present invention.

FIG. 5 illustrates a block diagram of a data processing system useable with one or more embodiments of the present invention. Data processing system 500 can be used, for example, to implement one or more nodes of a larger data processing system as previously described with respect to FIG. 3. Data processing system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., database proxy utility 324. Memory 520 is also used for storing temporary variables or other intermediate data during the execution of instructions by the processor 510.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; DBMS languages such as various implementations of SQL, and scripting languages such as Shell, Perl and Tcl/Tk. Additionally, database proxy utility 324 can be provided to the data processing system via a variety of machine-readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Data processing system 500 of the illustrated also includes devices such as keyboard 550, and mouse 552, network interface 554, graphics & display 556, hard disk 558, and CD-ROM 560, all of which are coupled to processor 510 by communications bus 505. It will be apparent to those having ordinary skill in the art that data processing system 500 can also include numerous elements not shown in the figure, such as additional storage devices, communications devices, input devices, and output devices, as illustrated by the ellipsis shown. According to one alternative embodiment of the present invention, such an additional data processing system device comprises a fibre channel interface.

In one embodiment, a method and system of the present invention may be applied to a proprietary database (i.e., a database having one or more unknown components and/or one or more known components, known or unknown, in an unknown arrangement or format) such as DB2® provided by International Business Machines (IBM) Corporation of Armonk, N.Y. However, although systems, methods, apparatus and software of the present invention have been described using database management system and database examples, it will be understood by those having ordinary skill in the art that extension can be made to virtually any data-producing process/application and the resulting data. Thus, the present application should not be thought of as being limited to use in the context of databases and database management systems.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the relevant arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future. Additionally, it should be understood that embodiments of the present invention are not limited to a particular type of data processing or computer system. Rather, embodiments of the present invention may be implemented in a wide variety of data processing systems (e.g., host computer systems, network switches, network appliances, and/or disk arrays).

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Although the present invention has been described in connection with specific embodiments, the invention is not intended to be limited to the specific forms set forth herein. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the present application is intended to cover such alternatives, modifications, and equivalents as can be reasonably included within the scope of the invention as defined by the appended claims, giving full cognizance to equivalents in all respects.

What is claimed is:

1. A method comprising:
    identifying which image creation technique of a plurality of image creation techniques was used to create at least a portion of a point-in-time image of a database;
    creating a logical copy of said point-in-time image of said database using said image creation technique, in response to said identifying said image creation technique of said plurality of image creation techniques;
    causing said logical copy to be stored; and
    presenting said logical copy of said point-in-time image of said database as a proxy for said database.

2. The method of claim 1, wherein
    said database comprises a plurality of components,
    said point-in-time image of said database comprises point-in-time images of selected components of said plurality of components, and
    said creating comprises creating a logical copy of each of said point-in-time images of said selected components using a corresponding image creation technique.

3. The method of claim 2, wherein said identifying comprises:
    identifying, for each of said point-in-time images of said selected components, said corresponding image creation technique.

4. The method of claim 1, wherein
    said database comprises a first physical storage structure,
    said logical copy of said point-in-time image of said database comprises a second physical storage structure, and
    said second physical storage structure differs from said first physical storage structure.

5. The method of claim 1, wherein said identifying comprises:
    identifying at least one of a backup utility process, a replication process, a mirroring process, a file system checkpoint creation process, a volume snapshot creation process, a copy command, and a volume.

6. The method of claim 1, wherein
    said database is associated with a first database owner instance, and
    said proxy for said database is associated with at least one of said first database owner instance and a second database owner instance.

7. The method of claim 1, wherein
    said database is associated with configuration data,
    said logical copy of said point-in-time image of said database is associated with a copy of said configuration data, and
    said presenting comprises
        modifying said copy of said configuration data.

8. The method of claim 7, wherein
said configuration data comprises an owner instance identifier specifying a first database owner instance, and
said modifying comprises
modifying said owner instance identifier to specify a second database owner instance.

9. The method of claim 1, wherein
said database is associated with an update log,
said update log comprises data specifying an update applied to said database after said point-in-time image of said database was created, and
said presenting comprises applying said update to said logical copy of said point-in-time image of said database using said update log in response to said creating.

10. The method of claim 9, wherein said applying comprises applying said update to said logical copy of said point-in-time image of said database in response to a determination that said database was active when said point-in-time image of said database was created.

11. The method of claim 1, wherein said point-in-time image comprises information identifying said image creation technique, and wherein said identifying comprises accessing said information in said point-in-time image.

12. A computer readable storage medium storing a plurality of instructions executable to:
identify which image creation technique of a plurality of image creation techniques was used to create at least a portion of a point-in-time image of a database;
create a logical copy of said point-in-time image of said database using said image creation technique, in response to identifying said image creation technique of said plurality of image creation techniques;
cause said logical copy to be stored; and
present said logical copy of said point-in-time image of said database as a proxy for said database.

13. The computer readable storage medium of claim 12, wherein
said database comprises a plurality of components,
said point-in-time image of said database comprises point-in-time images of selected components of said plurality of components, and
creating comprises creating a logical copy of each of said point-in-time images of said selected components using a corresponding image creation technique.

14. The computer readable storage medium of claim 13, wherein identifying said image creation technique comprises:
identifying, for each of said point-in-time images of said selected components, said corresponding image creation technique.

15. The computer readable storage medium of claim 12, wherein
said database comprises a first physical storage structure,
said logical copy of said point-in-time image of said database comprises a second physical storage structure, and
said second physical storage structure differs from said first physical storage structure.

16. The computer readable storage medium of claim 12, wherein identifying said image creation technique comprises:
identifying at least one of a backup utility process, a replication process, a mirroring process, a file system checkpoint creation process, a volume snapshot creation process, a copy command, and a volume.

17. The computer readable storage medium of claim 12, wherein
said database is associated with a first database owner instance, and said proxy for said database is associated with at least one of said first database owner instance and a second database owner instance.

18. The computer readable storage medium of claim 12, wherein
said database is associated with configuration data,
said logical copy of said point-in-time image of said database is associated with a copy of said configuration data, and
presenting said logical copy comprises
modifying said copy of said configuration data.

19. The computer readable storage medium of claim 18, wherein
said configuration data comprises an owner instance identifier specifying a first database owner instance, and
modifying said copy comprises
modifying said owner instance identifier to specify a second database owner instance.

20. The computer readable storage medium of claim 12, wherein
said database is associated with an update log,
said update log comprises data specifying an update applied to said database after said point-in-time image of said database was created, and
presenting said logical copy comprises applying said update to said logical copy of said point-in-time image of said database using said update log in response to creating the logical copy.

21. The computer readable storage medium of claim 20, wherein applying said update comprises applying said update to said logical copy of said point-in-time image of said database in response to a determination that said database was active when said point-in-time image of said database was created.

22. An apparatus comprising:
means for identifying which image creation technique of a plurality of image creation techniques was used to create at least a portion of a point-in-time image of a database;
means for creating a logical copy of said point-in-time image of said database using said image creation technique, in response to identifying said image creation technique of said plurality of image creation techniques;
computer readable storage means for storing the logical copy; and
means for presenting said logical copy of said point-in-time image of said database as a proxy for said database.

23. The apparatus of claim 22, wherein
said database comprises a plurality of components,
said point-in-time image of said database comprises point-in-time images of selected components of said plurality of components, and
said means for creating comprises means for creating a logical copy of each of said point-in-time images of said selected components using a corresponding image creation technique.

24. The apparatus of claim 22, wherein
said database is associated with configuration data,
said logical copy of said point-in-time image of said database is associated with a copy of said configuration data, and
said means for presenting comprises
means for modifying said copy of said configuration data.

25. The apparatus of claim 24, wherein
said configuration data comprises an owner instance identifier specifying a first database owner instance, and
said means for modifying comprises means for modifying said owner instance identifier to specify a second database owner instance.

26. The apparatus of claim 22, wherein
said database is associated with an update log,
said update log comprises data specifying an update applied to said database after said point-in-time image of said database was created, and
said means for presenting comprises means for applying said update to said logical copy of said point-in-time image of said database using said update log in response a creation of said logical copy of said point-in-time image of said database.

27. The apparatus of claim 26, wherein said means for applying comprises means for applying said update to said logical copy of said point-in-time image of said database in response to a determination that said database was active when said point-in-time image of said database was created.

28. A system comprising:
a first computer readable storage element to store a database; and
a database proxy utility configured to:
  identify which image creation technique of a plurality of image creation techniques was used to create at least a portion of a point-in-time image of a database;
  create a logical copy of said point-in-time image of said database using said image creation technique, in response to identifying said image creation technique of said plurality of image creation techniques;
  cause the logical copy to be stored on the first storage element; and
  present said logical copy of said point-in-time image of said database as a proxy for said database.

29. The system of claim 28, wherein
said database is associated with configuration data,
said logical copy of said point-in-time image of said database is associated with a copy of said configuration data, and
said database proxy utility is further configured to modify said copy of said configuration data.

30. The system of claim 28, wherein
said database is associated with an update log,
said update log comprises data specifying an update applied to said database after said point-in-time image of said database was created, and
said database proxy utility is further configured to apply said update to said logical copy of said point-in-time image of said database using said update log.

31. The system of claim 30, wherein said database proxy utility is further configured to apply said update to said logical copy of said point-in-time image of said database in response to a determination that said database was active when said point-in-time image of said database was created.

* * * * *